United States Patent [19]

Okamoto et al.

[11] Patent Number: 5,895,798
[45] Date of Patent: Apr. 20, 1999

[54] LIQUID RUBBER COMPOSITION

[75] Inventors: Naomi Okamoto; Takeshi Shoda, both of Ichihara, Japan

[73] Assignee: Ube Industries, Ltd., Ube, Japan

[21] Appl. No.: 08/944,420

[22] Filed: Oct. 6, 1997

[30] Foreign Application Priority Data

Oct. 8, 1996 [JP] Japan ............... 8-266938

[51] Int. Cl.$^6$ ............... C08L 9/00
[52] U.S. Cl. ............... 524/571; 524/572; 524/574; 524/575; 524/575.5; 523/166; 525/236; 525/237
[58] Field of Search ............... 524/571, 572, 524/574, 575, 575.5, 590, 871; 525/236, 237; 523/166

[56] References Cited

U.S. PATENT DOCUMENTS

| | | | |
|---|---|---|---|
| 3,989,769 | 11/1976 | Bonnington | 523/526 |
| 4,218,349 | 8/1980 | Minatono et al. | 524/474 |
| 4,257,468 | 3/1981 | Ogawa et al. | 524/251 |

FOREIGN PATENT DOCUMENTS

| | | |
|---|---|---|
| 2 232 559 | 1/1975 | France. |
| A-54-70349 | 6/1979 | Japan. |
| A-57-121024 | 7/1982 | Japan. |

OTHER PUBLICATIONS

Patent Abstracts of Japan, vol. 007, No. 034, Feb. 10, 1983.
Patent Abstracts of Japan, vol. 008, No. 062, Mar. 23, 1984.

*Primary Examiner*—James J. Seidleck
*Assistant Examiner*—Olga Asinovsky
*Attorney, Agent, or Firm*—Finnegan, Henderson, Farabow, Garrett & Dunner, L.L.P.

[57] ABSTRACT

A liquid rubber composition including a 1,2-polybutadiene resin component dispersed in the form of fine particles in a liquid rubber component in a weight ratio of 1:100 to 50:100 has a high dispersion stability and a low specific gravity and is useful for forming a cured rubber article having a high elastic modulus and a satisfactory mechanical strength and ultimate elongation.

6 Claims, No Drawings

LIQUID RUBBER COMPOSITION

BACKGROUND OF THE INVENTION

1. Field of the Invention

The present invention relates to a liquid rubber composition. More particularly, the present invention relates to a rubber composition comprising a liquid rubber component reinforced by fine particles of a 1,2-polybutadiene resin component.

2. Description of the Related Art

It is known that a liquid rubber has a flow property at room temperature, and thus allows processing procedures using liquid rubber to be easily mechanized, automated and carried out continuously and with reduced labor. Also, it is known that when the liquid rubber is cured by a certain chemical treatment, the resultant cured rubber exhibits similar physical properties to those of conventional vulcanized rubber materials and thus, usually, the cured liquid rubber can be reinforced by conventional inorganic fillers.

Japanese Unexamined Patent Publication No. 54-70,349 discloses that when a liquid polybutadiene rubber is mixed with an electroconductive filler, a cured rubber material having a stable electroconductivity is obtained. Also, Japanese Examined Patent Publication No. 1-37,407 discloses that when a liquid diene polymeric material is mixed with carbon black having a specific average molecular weight and a specific particle size, a cured elastic material having excellent flexing resistance and cutting resistance.

However, the inorganic fillers are disadvantageous in that since the inorganic fillers have a significantly higher specific gravity than that of the liquid rubber, it is difficult to uniformly disperse the inorganic fillers in the liquid rubber and even when uniformly dispersed in the liquid rubber, the inorganic fillers separate from the liquid rubber within a short time.

SUMMARY OF THE INVENTION

An object of the present invention is to provide a liquid rubber composition having a low specific gravity and comprising organic filler particles dispersed in a liquid rubber component with a high dispersion stability.

Another object of the present invention is to provide a liquid rubber composition comprising organic filler particles which are uniformly dispersed in a liquid rubber component and are not separated from the liquid rubber component even when the liquid rubber composition is subjected to various processing procedures.

Still another object of the present invention is to provide a liquid rubber composition comprising organic filler particles dispersed in a liquid rubber component, the organic filler particles exhibiting a high reinforcing performance for the liquid rubber component equal to or higher than the reinforcing performance of conventional reinforcing carbon black particles.

The above-mentioned objects can be attained by the liquid rubber composition of the present invention which comprises a liquid rubber component and a particulate 1,2-polybutadiene resin component in an amount of 1 to 50 parts by weight per 100 parts by weight of the liquid rubber component, and dispersed in the form of fine particles in the liquid rubber component.

In the liquid rubber composition of the present invention, preferably the particulate 1,2-polybutadiene resin component comprises a syndiotactic 1,2-polybutadiene resin having a melting temperature of 110° C. or more.

The liquid rubber composition of the present invention can be produced by a method comprising mixing a liquid rubber component with a 1,2-polybutadiene resin component in an amount of 1 to 50 parts by weight per 100 parts by weight of the liquid rubber component; and stirring or kneading the resultant mixture at a temperature equal to or higher than the melting temperature of the 1,2-polybutadiene resin component, to disperse the 1,2-polybutadiene resin composition in fine particles.

DESCRIPTION OF THE PREFERRED EMBODIMENTS

The liquid rubber component usable for the liquid rubber composition of the present invention comprises at least one liquid rubber polymer having a flow property at room temperature, capable of being cured by a certain chemical treatment to form a cured rubber composition having a three dimensional network structure and exhibiting similar physical properties to those of conventional vulcanized rubber materials.

The liquid rubber polymer usable for the composition of the present invention is preferably selected from those having at least one functional terminal group which is capable of chain-extending and cross-linking intermolecularly the rubber polymer, for example, hydroxyl, carboxyl, epoxy, amino, and mercapto groups. The liquid rubber polymer preferably has an average molecular weight of 500 to 8,000 and selected from, for example, polybutadiene, polyisoprene, polychloroprene, styrene-butadiene copolymer, acrylonitrile-butadiene copolymer, butadiene-isoprene copolymer, and ethylene-propylene-butadiene copolymer liquid rubbers. Namely, the liquid rubber polymer can be selected from telechelic liquid rubber materials, liquid polyurethane rubber materials, synthetic polysulfide liquid rubber materials and thermally decomposed liquid rubber materials. These liquid rubber materials may be used alone or in mixture of two or more thereof.

The cross-linking of the liquid rubber polymer can be effected by using a cross-linking agent. The cross-linking agent is preferably selected from organic polyisocyanate compounds, for example, tolylenediisocyanate, hexamethylene-diisocyanate, diphenylmethanediisocyanate, liquid modified diphenylmethanediisocyanate, and cyclohexyldiisocyanate. The cross-linking of the liquid rubber polymer is optionally carried out in the presence of a cross-linking catalyst. The catalyst is preferably selected from di-n-butyl-tin dilaurate, triethylenediamine, diethylenediamine, metal salts of naphthionic acid, and metal salts of octylic acid.

The particulate 1,2-butadiene resin component usable for the present invention preferably comprises at least one syndiotactic 1,2-polybutadiene (SPBD) resin having a melting temperature of 110° C. or more, more preferably 130° C. or more.

When the melting temperature is less than 110° C., the resultant SPBD may exhibit an unsatisfactory crystallinity and thus the resultant 1,2-polybutadiene resin particles may have an insufficient reinforcing property for the liquid rubber component, and the resultant liquid rubber composition may exhibit an unsatisfactory heat resistance.

In the liquid rubber composition, the syndiotactic 1,2-polybutadiene resins may be contained alone or in combination of two or more thereof different in melting temperature from each other.

In the liquid rubber composition of the present invention, the particulate 1,2-polybutadiene resin component is present in an amount of 1 to 50 parts by weight, preferably 5 to 30 parts by weight, per 100 parts by weight of the liquid rubber component. When the amount of the particulate 1,2-polybutadiene resin component is less than 1 part by weight, the resultant particulate 1,2-polybutadiene resin component cannot sufficiently reinforce the liquid rubber component. Also, an amount of the particulate 1,2-polybutadiene resin component of more than 50 parts by weight, causes a reduction in the breaking strength of the resultant liquid rubber composition or a cured article of the composition with an increase in the amount of the particulate 1,2-polybutadiene resin component.

The SPBD usable for the present invention can be produced by conventional methods discussed in Japanese Examined Patent Publication No. 53-39,917, No. 54-5,436 and No. 56-18,005. The production methods of the SPBD are not limited to those mentioned above.

In the liquid rubber composition of the present invention, the 1,2-polybutadiene resin component is in the form of fine particles preferably having an average particle size of 0.01 to 10 μm, more preferably 0.05 to 5 μm, and is dispersed in the liquid rubber composition.

The liquid rubber composition of the present invention optionally further comprises conventional additives for rubber materials, for example, other polymers, carbon black, antiaging agents, and cross-linking agents, in a desired amount.

The liquid rubber composition of the present invention can be produced by mixing the liquid rubber component with the 1,2-polybutadiene resin component and kneading the mixture at a temperature equal to or higher than the melting temperature of the 1,2-polybutadiene resin component, preferably 0 to 40° C., more preferably 5 to 30° C. above the melting temperature of the 1,2-polybutadiene resin component.

The kneading procedure can be carried out by using conventional kneading means, for example, a stirrer-type mixture, kneading roll, and extruder. During the kneading procedure, the 1,2-polybutadiene resin component is melted and divided into fine particles having an average particle size of 0.01 to 10 μm.

The resultant liquid rubber composition can be shaped into a desired form by conventional shaping means, for example, an extruder, injection molder, calender, compression molder, blow molder, foam molder or transfer molder, at a temperature equal to or higher than the melting temperature of 1,2-polybutadiene resin component.

During the kneading and/or shaping procedure, the rubber component can be chain-extended and cross-linked in the presence of the cross-linking agent or the cross-linking catalyst.

EXAMPLES

The present invention will be further explained by the following examples which does not intend to restrict the scope of the present invention in any way.

In the examples, the melting temperature of the 1,2-polybutadiene resin component, the stability of the composition, the tensile stress, tensile strength, tensile elongation at break and specific gravity of the rubber composition specimen were determined by the following tests.

(1) Melting temperature of 1,2-polybutadiene resin component

The melting temperature of 1,2-polybutadiene resin component was determined from an endothermic peak thereof measured by using a heat flow bundle differential scanning colorimeter (model: DSC 50, made by K. K. Shimazu Seisakusho) while rising the temperature from 30° C. to 230° C. at a temperature-rising rate of 10° C./minute.

(2) Stability of the liquid rubber composition

The liquid rubber composition immediately after the preparation thereof was left to stand at room temperature for 24 hours, and observed by naked eye whether or not the particulate 1,2-polybutadiene resin component is kept in uniform dispersion or separated from the liquid rubber component.

(3) Tensile stress, tensile strength and elongation at break of specimen

The liquid rubber composition was shaped into a dumbbell-shaped specimen in accordance with Japanese Industrial Standard (JIS) K 6301. The 100% tensile stress, tensile strength and tensile elongation at break of the specimen were measured in accordance with JIS K 6301.

(4) Specific gravity

The liquid rubber composition was shaped into a sheet having a thickness of 2 mm. The specific gravity of the sheet was measured by using an automatic gravimeter (H-D type).

Referential Examples 1 to 3

Preparation of 1,2-polybutadiene resins (SPBD)

In each of Referential Examples 1 to 3, a-1,2-polybutadiene resin (SPBD) to be used in the examples was prepared as follows.

An autoclave having a capacity of 1.5 liters and filled by a nitrogen gas by which air in the autoclave was replaced, was charged with 760 ml of dehydrated benzene, and 74 g of 1,3-butadiene was dissolved in the dehydrated benzene. Then, to the solution, 1m mole of cobalt octoate (in the form of a benzene solution having a concentration of 1 mole/ml) was added, and one minute after the addition, 2m moles of triethyl aluminum (in the form of a benzene solution having a concentration of 1 m mole/ml) were added. The resultant mixture was stirred for one minute, and then to the stirred mixture, acetone was added in the amount as shown in Table 1. One minute after the addition of acetone, 0.6m mole of carbon disulfide (in the form of a benzene solution having a concentration of 0.3m mole/ml) was added to the mixture, the resultant reaction mixture was stirred at a temperature of 10° C. for 60 minutes to polymerize 1,3-butadiene and to produce a syndiotactic 1,2-polybutadiene resin (SPBD). The resultant solution of the SPBD was added with 0.75g of 2,4-di-tert-butyl-p-cresol. The resultant SPBD solution was mixed into 1000 ml of methyl alcohol to allow the SPBD to precipitate. The resultant SPBD was collected by filtration and rinsed with methyl alcohol. The rinsed SPBD was collected by filtration and dried at room temperature under vacuum. The melting temperature of the resultant SPBD is shown in Table 1.

TABLE 1

| Item | Referential Example No. Referential Example | | |
|---|---|---|---|
| | 1 | 2 | 3 |
| Amount of acetone (m, mole) | 1,100 | 760 | 290 |
| Melting temperature of SPBD (°C.) | 140 | 150 | 170 |

EXAMPLES 1 to 4

In each of Examples 1 to 4, a one liter separable flask in which air was replaced by a nitrogen gas was charged with 500 g of a liquid polybutadiene (trademark: Polybd-45M, made by Alcochemical Co.) provided with α,ω-hydroxyl end-groups and having a number average molecular weight of 3,000 to 4,000 and a viscosity of 50 poises at 30° C., the SPBD of the type and in the amount shown in Table 2, and 5 g of an antioxidant comprising stearyl-3-(4-hydroxy-3,5-di-tert-butylphenyl)propionate. The mixture in the flask was heat-stirred at a temperature of 20° C. above the melting temperature of the SPBD for 30 minutes, to provide a liquid rubber composition in which the SPBD was uniformly dispersed in the average particle size as shown in Table 2.

The liquid rubber composition was cooled to room temperature and then mixed with 35 g of tolylenediisocyanate and 0.5 g of dibutyltin dilaurate. The mixture was heat-stirred for 10 minutes and defoamed under reduced pressure. Then the mixture was left to stand at room temperature for 24 hours. By naked eye observation, it was confirmed that no separation of the dispersed SPBD component particles from the liquid rubber component occurred, and the mixture was kept in a uniform dispersion form.

Then the mixture was charged in a mold and pre-cured at a temperature of 100° C. for 90 minutes, and further post-cured at a temperature of 70° C. for 12 hours. A sheet with a thickness of 2 mm was obtained. The tensile test was applied to the sheet. The test results are shown in Table 2. In Table 2, it was confirmed that the cured sheet exhibited a high moduls of elasticity (100% tensile stress) satisfactory tensile strength and elongation at break and a low specific gravity.

COMPARATIVE EXAMPLES 1 and 2

In each of Comparative Examples 1 and 2, a one liter separable flask in which air was replaced by a nitrogen gas was charged with 500 g of a liquid polybutadiene (trademark: Polybd-45M, made by Alcochemical Co.) provided with α,ω- hydroxyl end-groups and having a number average molecular weight of 3,000 to 4,000 and a viscosity of 50 poises at 30° C, carbon black (trademark: HAF, made by Mitsubishi Kagakukogyo K. K.) having a particle size of 0.03 nm and a DBP oil absorption of 110 ml/100 g in the amount as shown in Table 2, and 5 g of an antioxidant comprising stearyl-3-(4-hydroxy-3,5-di-tert-butylphenyl) propionate. The mixture in the flask was heat-stirred at a temperature of 70° C. for 30 minutes, to provide a liquid rubber composition in which the carbon black particles were uniformly dispersed.

The liquid rubber composition was cooled to room temperature and then mixed with 35 g of tolylenediisocyanate and 0.5 g of dibutyltin dilaurate. The mixture was heat-stirred for 10 minutes and defoamed under reduced pressure. Then the mixture was left to stand at room temperature for 24 hours. By naked eye observation, it was confirmed that the carbon black particles were separated from the liquid rubber component and upper portion of the mixture became transparent.

The mixture was stirred again and charged in a mold and pre-cured at a temperature of 100° C for 90 minutes, and further post-cured at a temperature of 70° C. for 12 hours. A sheet with a thickness of 2 mm was obtained. The tensile test was applied to the sheet. The test results are shown in Table 2.

TABLE 2

| | | Example No. | | | | | |
|---|---|---|---|---|---|---|---|
| | | Example | | | | Comparative Example | |
| Item | | 1 | 2 | 3 | 4 | 1 | 2 |
| Composition of liquid rubber composition (part by weight) | Liquid rubbers | 100 | 100 | 100 | 100 | 100 | 100 |
| | Carbon black | — | — | — | — | 20 | 40 |
| | SPBD | | | | | | |
| | Ref. Ex. 1 | 10 | 20 | — | — | — | — |
| | Ref. Ex. 2 | — | — | 10 | — | — | — |
| | Ref. Ex. 2 | — | — | — | 10 | — | — |
| Average particle size (μm) | | 0.5 | 0.7 | 0.6 | 0.8 | 0.3 | 0.5 |
| Dispersion stability | | good | good | good | good | Bad | Bad |
| Physical properties | 100% modulus of elasticity (Pa) | 2.2 | 3.1 | 2.3 | 2.5 | 1.2 | 1.8 |
| | Tensile strength (Pa) | 10.2 | 10.9 | 10.6 | 10.5 | 11.3 | 11.9 |
| | Elongation at break (%) | 510 | 430 | 520 | 500 | 580 | 460 |
| | Specific gravity | 0.92 | 0.93 | 0.92 | 0.92 | 1.02 | 1.08 |

Note: The volumes of 10 and 20 parts by weight of SPBD are similar to the volumes of 20 and 40 parts by weight of carbon black, respectively.

In the liquid rubber composition of the present invention, the particulate 1,2-polybutadiene resin component are stably kept in the form of fine particles uniformly dispersed in the liquid rubber component without separation.

The stable dispersion of the 1,2-polybutadine resin component in the liquid rubber component can be attained by stirring or kneading a mixture of the 1,2-polybutadiene resin component with the liquid rubber component at a temperature equal to or higher than, preferably of 0 to 40° C. above the melting temperature of the 1,2-polybutadiene resin component.

When the liquid rubber composition of the present invention is shaped and cured by a chemical treatment, the resultant shaped article exhibits an enhanced modulus of elasticity and mechanical strength, and a satisfactory elongation at break and has a low specific gravity.

We claim:

1. A liquid rubber composition comprising a liquid rubber component comprising at least one liquid rubber polymer selected from the group consisting of telechelic liquid rubber materials, liquid polyurethane rubber materials, synthetic polysulfide liquid rubber materials and thermally decomposed liquid rubbrer materials, each material having at least one functional terminal group which is capable of intermolecularly chain-extending and cross-linking the rubber polymer molecules therethrough, and having an average molecular weight of from 500 to 8,000 and a particulate 1,2-polybutadiene resin component which comprises one or more syndiotactic 1,2-polybutadiene resins having a melting temperature of 110° C. or more, said resin component being present in an amount of from 1 to 50 parts by weight per 100 parts by weight of the liquid rubber component and being dispersed in the liquid rubber component in the form of fine particles having an average particle size of 0.01 to 10 μm.

2. The liquid rubber composition as of claim 1, wherein the liquid rubber polymer is selected from the group consisting of polybutadiene, polyisoprene, polychloroprene, styrene-butadiene copolymer, acrylonitrile-butadiene copolymer, butadiene-isoprene copolymer and ethylene-propylene-butadiene copolymer liquid rubber polymers, the functional terminal group being selected from the group consisting of hydroxyl, carboxyl, epoxy, amino, and mercapto groups.

3. The liquid rubber composition of claim 1, further comprising a cross-linking agent.

4. A method of producing the liquid rubber composition of claim 1, comprising mixing the liquid rubber component with the 1,2-polybutadiene resin component in an amount of 1 to 50 parts by weight per 100 parts by weight of the liquid rubber component; and stirring or kneading the resultant mixture at a temperature equal to or higher than the melting temperature of the 1,2-polybutadiene resin component, to disperse the 1,2-polybutadiene resin component as fine particles.

5. The method of claim 4, wherein the stirring or kneading temperature is from 0 to 40° C. above the melting temperature of the 1,2-polybutadiene resin component.

6. The method of claim 4, wherein during mixing, a cross-linking agent is added to the mixture of the liquid rubber component and the 1,2-polybutadiene resin component.

* * * * *